INVENTORS.
Walter F. Gerdes
Hogan A. Randle

William R. Narris
ATTORNEY

Aug. 27, 1968 W. F. GERDES ET AL 3,399,133
METHOD FOR DEVELOPING A CONTROL SIGNAL AND FLOCCULATING
PROCESS EMPLOYING SAME
Filed Oct. 11, 1963 2 Sheets-Sheet 2

INVENTORS.
Walter F. Gerdes
Hogan A. Randle
BY
William R. Nallí
ATTORNEY

United States Patent Office

3,399,133
Patented Aug. 27, 1968

3,399,133
METHOD FOR DEVELOPING A CONTROL SIGNAL AND FLOCCULATING PROCESS EMPLOYING SAME
Walter F. Gerdes, Lake Jackson, and Hogan A. Randle, Angleton, Tex., assignors to The Dow Chemical Company, Midland, Mich., a corporation of Delaware
Filed Oct. 11, 1963, Ser. No. 315,562
20 Claims. (Cl. 210—42)

ABSTRACT OF THE DISCLOSURE

Processes are provided for developing a control signal related to the surface charge condition of solids in aqueous dispersion by flowing the aqueous dispersion over a dielectric surface and detecting through electrodes spaced apart at points along the flow path in direction of flow the rate of charge transport. The signal thus developed is used in flocculation processes to control the amount of charge influencing chemical added to the aqueous dispersion. One mode of operation involving alternately flowing the dispersion and a second aqueous medium over the dielectric surface yields a signal of significantly increased amplitude. Either voltage or current incidents of the charge transport may be measured. Measuring current has the advantage of being less sensitive to conductance of the aqueous dispersion. Preferably the conductance is less than that of an aqueous solution containing 100 parts per million of sodium chloride.

---

The present invention relates to a novel process for developing an electrical signal useful in the promotion and controlling of flocculation phenomena. Particularly, the process of the invention provides dosing control for the addition of charge influencing chemical agents to aqueous systems comprising dispersed, i.e., suspended and/or dissolved, electrically charged particles susceptible to flocculation.

It is conventional practice in clarifying aqueous systems containing electrically charged particles to employ a flocculation process. Once flocculated, the particles can be separated from their water medium by sedimentation, flotation, centrifugation, or one or more of the foregoing physical separatory processes in combination. Conventionally, the flocculation process is promoted by the use of charge influencing, i.e., flocculating, chemicals such as alum, ferric sulfate, ferrous sulfate, ferric chloride, lime, aluminates, clays and various electrically charged, water-dispersible organic polymers. As used herein "flocculation" refers to precipitation followed by flocculation of the precipitate as well as flocculation of pre-existing suspended finely divided solids.

Aqueous dispersions of charged particles are encountered in natural or raw water supplies such as rivers and lakes and in municipal and industrial wastes. While all of these water sources generally comprise some organic matter, the wastes contain solids of which a substantial proportion is suspended and dissolved organic matter. Removal of this organic matter by flocculation processes is difficult, and much effort has been expended to the end of improving the efficiency of such processes.

In a typical flocculation process for the clarification of municipal sewage, a water-soluble cationic flocculating chemical is added to the sewage. The sewage normally comprises negatively charged organic particles in suspension and thus the addition of the charge influencing cationic agent results in neutralization of the charged sites on the suspended particles. When the average surface charge of the particles is zero, or approaching zero, the dispersed organic particles undergo flocculation, i.e., aggregation, at an optimum rate. Too much cationic agent, however, creates positively charged organic particles which can be as difficult to flocculate as the originally negatively charged particles.

To date, the control of chemical dosing in flocculation processes such as the foregoing has been largely empirical. Once a treatment level is established for a given system by experimentally determining a dosage level for a given sample of the system, the flocculating chemical is added to the dispersion at an effectively constant dosage rate. This technique is satisfactory for those operations wherein the aqueous dispersion to be flocculated is essentially constant for substantial periods of time in its flocculating chemical demand. In most systems on which flocculation processes are practiced such as the natural water sources and municipal and industrial wastes, however, the flocculating chemical demand for optimum results will vary over wide ranges within brief periods of time. As a result the application of a flocculant at a uniform rate will not produce consistent and efficient removals of the water contaminants.

A recent proposal to achieve better control over the addition of flocculating chemicals to aqueous suspensions of finely divided particles involves direct readings of the zeta potential of the finely divided particles in aqueous suspension. The zeta potential, i.e., surface charge condition of the finely divided suspended solids, is somewhat indicative of charge influencing chemical requirements for optimum flocculation of the solids. It does not, however, reflect the flocculating chemical demand of electrically charged components dissolved in the system which might be precipitated by the flocculating chemical. Conventional determination of the zeta potential involves observing, under a microscope, light reflected from suspended, charged particles as they migrate through an aqueous medium under the influence of an electric field. The velocity of particle migration taken with the magnitude of the electrical field provides the necessary parameters for ascertaining the zeta potential. This technique is fundamentally a batch process and does not appear to be conveniently adaptable to continuous or automatic operation.

It is desirable and a principal object of the present invention to provide a novel process for developing an electrical signal useful in controlling flocculation of charged particles dispersed in aqueous systems. A particular object is to provide a novel process for applying water-dispersible, charge influencing or flocculating chemicals to flowing aqueous suspensions of finely divided charged particles whereby optimum aggregation of the particles is achieved through substantially instantaneous response to the flocculating chemical demand or charge conditions existing within the system to be flocculated. Specific objects include the provision of novel and highly efficacious controls for the application of water-dispersible, flocculating chemicals to municipal and industrial organic wastes. An especially significant object is that of providing a controlled process for dosing charge influencing, flocculating chemicals into aqueous streams containing suspended, finely divided, charged organic particles, which streams contain disperse phases characterized by variable average surface charge conditions as the stream is viewed in the direction of flow. The terminology "average surface charge condition" refers to the average charge density at the surface of the dispersed particles, as indicated by the zeta potential of the particles, in a given volume of the dispersion. It is independent of the concentration of the suspended particles. These objects, as well as numerous other benefits will become apparent hereinafter as the invention is more fully described.

The aforedescribed objects are accomplished in accordance with the process of the present invention. This process comprises flowing an aqueous dispersion containing charged particles susceptible of chemically promoted flocculation along a predetermined flow path which is, at least for part of the distance along the flow path, defined by a substantially water-insoluble, dielectric surface, the flowing dispersion, as viewd along the predetermined flow path, having disperse phases characterized by variable average surface charge conditions. That is to say, if one were to measure the zeta potential of the suspended particles from time to time in samples taken from a given position along the flow path, different zeta potentials would be observed. The process further comprehends detecting, through sensing electrodes, preferably substantially identical electrodes, at spaced apart points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, along which path the dispersion of charged particles has previously flowed. The flowing aqueous medium utilized for this purpose may simply be the continued flowing of the aqueous dispersion itself. If it is such, the rate of charge transport in the flowing dispersion is conveniently detected at the electrodes simultaneously and continuously during the flowing of the dispersion over the dielectric surface, and as a result, a continuous electrical signal is obtained in a measuring circuit connecting the electrodes. This signal is responsive to either a voltage or current incident of the developed rate of charge transport. Preferably, however, for reasons and benefits more fully discussed hereinafter, an aqueous medium different from the aqueous dispersion is used. This second aqueous medium may be distilled water, water from a natural source which preferably has an electroconductance of less than that of an aqueous solution containing about 100 parts per million of sodium chloride, or other aqueous media of the like low electroconductance, including miscible combinations of water and organic compounds.

When the aqueous medium used is different than the aqueous dispersion being measured for its flocculating chemical demand, the two systems, i.e., the aqueous dispersion of charged particles and the second aqueous medium, are flowed alternately along the flow path between the electrodes according to a predetermined cyclical pattern during which a minimum of about one second, and preferably at least ten seconds, is the duration of each flow period. The longer period of time insures better stabilization of the conditions for charge transport in the stream flowing along the portion of the flow path defined by the dielectric surface. While there is no upper limit on these time periods, practical considerations favor a maximum of no more than about ten minutes for each flow period.

At some point in the complete cycle, during which the aqueous medium is flowing, the rate of charge transport in the flowing aqueous medium between the electrodes is detected as current or voltage to give an intermittent or blip type of electrical signal. The amplitude of the intermittent signal thus obtained can be utilized, and the same is true in the instance of the continuous signal derived as described above, for evaluating the effect of charge influencing chemicals in flocculation processes.

In either the continuous or blip signal processes, that portion of the flowing aqueous medium along the flow path included between the sensing electrodes should have low resistivity as compared to the resistivity of any other electrical circuit or circuits, excluding from consideration the measuring circuit through the electrodes, which alternate circuit or circuits can be defined between a point downstream and another point upstream along the flow path. Such an alternate electrical circuit might utilize, for example, electrical ground and/or communicating liquid streams to complete the circuit. Illustratively, low resistivity means on the order of magnitude of 20 percent of the resistivity of any such other circuit or less. Preferably the aqueous medium is fed to the flow path along the dielectric surface, or discharged therefrom, in a manner such that the continuity of the stream entering or leaving the flow path is broken. In effect, it is preferred that the aqueous medium flowing along the flow path during detection of the control signal is in an open circuit in relation to electrical ground.

Detection of the rate of charge transport is specifically accomplished by contacting the flowing aqueous medium with two substantially identical electrodes, which for best results are reversible electrodes, spaced apart along the flow path such that for at least a part of the distance between electrodes, the aqueous medium flows along a section of the flow path defined solely by the dielectric surface. The electrodes are electrically integrated into suitable external electrical measuring circuits, which, by utilizing auxiliary electrical power, provide an amplified electrical signal responsive to a voltage or current incident of the rate of charge transport developed in the aqueous medium along the flow path between the two electrodes. The signal thus generated bears a useful relationship to the average, surface-charge condition of the charged particles in the aqueous dispersion flowed along the flow path. Through empirical means, such as by calibrating this signal against zeta potential readings on the dispersed charged particles, the electrical signals generated by this process can be used to evaluate the charge influencing capabilities of chemical flocculants in a given aqueous dispersion.

Charge influencing chemicals are those chemical agents, either inorganic or organic, which when dissolved in an aqueous dispersion of charged particles alter the charge condition of the dispersed particles. As previously discussed, this charge condition of the particles is reflected by their zeta potential. All soluble chemical flocculants function to some degree in altering the charge condition of the dispersed phase. Often the flocculant is opposite in charge to the disperse phase and upon proper balancing of the charges by controlling the dose of the flocculant, charge neutralization occurs with resulting optimum flocculation of the disperse phase.

Depending upon whether current or voltage is measured as an incident of the charge transport developed in the flowing aqueous medium, there are parameters of the process, unique to the type of electrical measurements to be made, which affect the strength and reliability of the signal ultimately obtained. If the external circuitry into which the electrodes are integrated measures voltage, the resistivity (reciprocal of conductance) of the aqueous medium flowing detection of the developed rate of charge transport and the dynamic pressure drop, friction loss, or in general, any energy difference, as the result of accelerating or deaccelerating forces, possessed by the flowing stream between the electrodes should be regulated for best results. In the instance of the resistivity parameter, the aqueous medium, or aqueous dispersion of finely divided charged particles when simultaneous detection is employed, should have an electroconductance equivalence of less than that of an aqueous solution containing 500 parts per million of sodium chloride.

Along a given flow path, the energy difference possessed by the flowing aqueous medium, e.g., dynamic pressure drop or friction loss between the electrodes contacting the aqueous medium must be sufficient to develop a rate of charge transport in the aqueous medium of an amplitude large enough to be measured by available detection means. This energy difference is a function of the distance parallel to the direction of flow between the electrodes and the velocity of the flowing aqueous medium. The velocity variable is normally the easiest to adjust in any given piece of equipment.

By reference to measurements made on aqueous dispersions flowing in a tubular dielectric conduit, it has been ascertained that the velocity of the aqueous medium should be large enough to result in a dynamic pressure drop between the electrodes of at least about 3 pounds per square inch, preferably about 5 pounds per square inch, or the equivalent energy difference in an open duct, in order to generate significant rates of charge transport which can be reliably detected by available voltage detection means. The required energy difference may also be created by acceleration of the flowing stream as by subjecting the stream to centrifugal forces. While there is no upper limit on the energy difference which can be employed, other than that dictated by practical considerations of confining the flowing stream, it is preferred, at least when the sensing electrodes are less than 20 centimeters or so apart, that the velocity of the aqueous medium be maintained within the region of laminar flow.

When current is the incident of the rate of charge transport measured, the only parameters of the process requiring control for best results are the energy difference in the flowing aqueous medium between the electrodes as described above and the peripheral line of contact between the flowing aqueous medium and the dielectric surface, said line being measured at any point along the flow path defined solely by the dielectric surface included between the electrodes. "Peripheral line of contact" herein has reference to the length of the line of contact between the flowing aqueous medium and the dielectric surface, said line being in a plane perpendicular to the direction of flow of the aqueous medium. For good signal amplitudes, such peripheral line of contact should be at least about 0.1 centimeter long.

From the foregoing considerations, it is clear the measuring of current has several advantages in that it has substantially greater independence of the resistivity or conductance of the aqueous medium flowing during detection of the signal. Illustratively, while voltage measurements generally cannot be made effectively on an aqueous media containing in excess of 500 parts per million of NaCl, or solute giving the equivalent conductance, useful signals are obtained with such aqueous media and those of greater conductance by measuring current in the external circuitry between the electrodes.

In a further and highly useful embodiment of the invention, the aforedescribed voltage and current incidents of the rate of charge transport developed between the electrodes are utilized to control the addition of a water-soluble, charge influencing chemical flocculant to a stream of an aqueous dispersion of charged particles, said disperse particles having a varying average surface charge condition in the direction of stream flow. This embodiment of the process comprises adding the flocculant to the aqueous dispersion with mixing. The mixing is sufficient to produce a uniform distribution of the flocculant throughout the flowing aqueous dispersion. Thereafter the process comprises flowing the flocculant treated aqueous dispersion, usually only a small representative portion of the treated stream is used, along a predetermined flow path and in contact with a substantially water-soluble dielectric surface. The rate of charge transport developed by flowing an aqueous medium along the same flow path is detected to generate an electrical signal as hereinbefore described through suitably positioned electrodes coupled with appropriate circuitry for the measurement of either voltage or current. Similarly, the flowing aqueous medium included between the electrodes is preferably in an open circuit in relation to electrical ground.

Similar to the technique previously described, the aqueous medium flowed along the dielectric surface while generating the signal may be the flocculant treated dispersion, in which case a simultaneous and continuous control signal is obtained, or it may be a different aqueous medium such as distilled water or other aqueous media preferably of low electroconductance, in which case an intermittent or blip type of control signal is produced. The blip signals occur because they are only measured during a small part of the time required for the complete cycle, i.e., while flowing the aqueous medium different from the treated dispersion along the flow path. As before, the incident of the rate of charge transport developed in the flowing stream sensed through the electrodes may be either voltage or current.

Through appropriate circuitry, either the voltage or current values are converted to an amplified electrical control signal which bears a known relationship to the rate of charge transport developed along the flow path between the two electrodes. The process further involves feeding this amplified control signal to a servomechanism whereby deviations in the input control signal from a set point create further electrical signals which when fed to suitable transducers control mechanical means for dosing a flocculating chemical into the aqueous dispersion stream at a point upstream from the sampling point for the described control generating phase of the process. In this manner the amount of the charge influencing flocculant added to the stream is automatically adjusted so as to maintain the disperse particles at a predetermined charge condition. For most operations involving flocculation of finely divided charged particles the preset level on the servomechanism will correspond to that charge condition at which a desired flocculation efficiency is achieved. Flocculation efficiencies will vary according to the objectives of the process, but in general will be a function of the desired extent of removal of the charged particles in the aqueous dispersion. Thus, in a given process, such as the clarification of sewage by flocculation and sedimentation, the preset level at which the process is operated can be empirically ascertained by evaluating process efficiencies over a series of incrementally differing set points until optimum performance is achieved.

For illustrations of the concepts of the present invention and the various embodiments which it may take, as well as applications of the control signal, refer to the attached drawings. In the drawings, wheresoever possible, like characters of reference designate the corresponding component, material and parts throughout several views in which.

Figure 1:
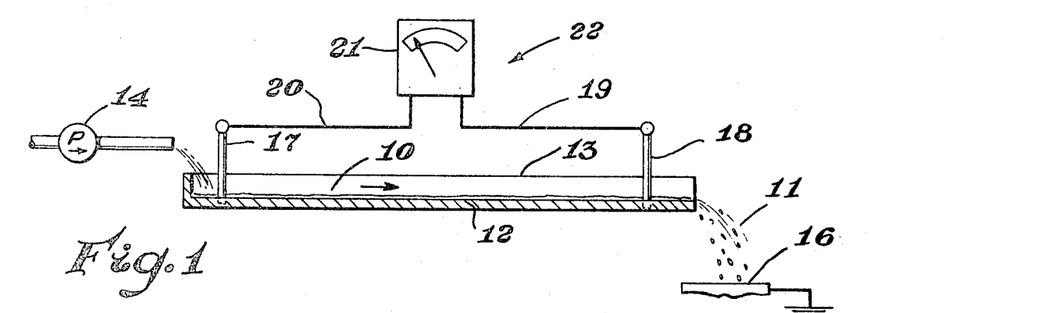
FIGURE 1 is a schematic view of apparatus components and process steps essential to one embodiment of the control signal generating process of the invention.

Particularly FIGURE 1 illustrates a most elemental form of the control generating process wherein a flowing stream 10 of an aqueous dispersion of charged particles is provided by means of a pump 14 which discharges the flowing stream 10 over a dielectric surface 12. The flowing stream 10 is confined to a predetermined flow path by means of dielectric walls of which side wall 13 is illustrative. The flowing stream 10 discharges from the dielectric surface 12 in a broken or discontinuous flow 11 such that any possible electrical connection between a point downstream in the flowing stream 10 with another point upstream therefrom through electrical ground 16, is interrupted. In other words, the flowing stream 10 is in an open circuit in relation to electrical ground 16. Contacting the flowing stream 10 at spaced apart positions, one downstream from the other in a direction parallel to the direction of liquid movement, are two substantially identical electrodes, that is, an upstream electrode 17 and a downstream electrode 18. These electrodes are electrically integrated through lead wires 19 and 20 into an external circuit 22 containing a sensitive detection device 21 for measuring either voltage or current incidents of the rate of charge transport developed in the flowing stream 10. The detection device 21 is an electrometer designed for either voltage or current measurement to an accuracy of plus or minus 1 microvolt or 0.01 microampere, respectively, at a threshold sensitivity of 2 microvolts or 0.02 microampere.

Figure 2:
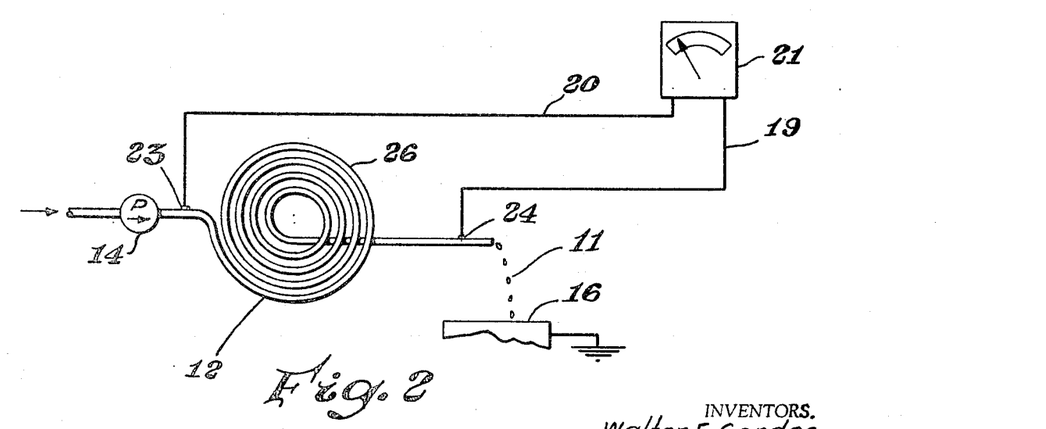
FIGURE 2 schematically illustrates another fundamental embodiment of the control signal generating process.

The aqueous dispersion of finely divided particles can be flowed over the dielectric surface by any convenient means. For instance, the energy required to produce the flowing stream can be supplied by hydrostatic pressure or by kinetic energy imparted to the stream in pumps or centifugal force generating means. In FIGURE 1 the flowing stream 10 is produced across the dielectric surface 12 as a result of the kinetic energy possessed by the liquid as it is discharged from the pump 14. In FIGURE 2 a pump 14 forces the flowing stream of the aqueous dispersion through a length of dielectric rubber tubing 26 sufficiently long to cause a pressure drop between the upstream electrode 23 and the downstream electrode 24 of at least about 3 pounds per square inch. The electrodes are electrically integrated into suitable external electrical circuitry as in FIGURE 1. Also the flowing stream is discharged to electrical ground 16 in discontinuous flow 11.

Figure 3:
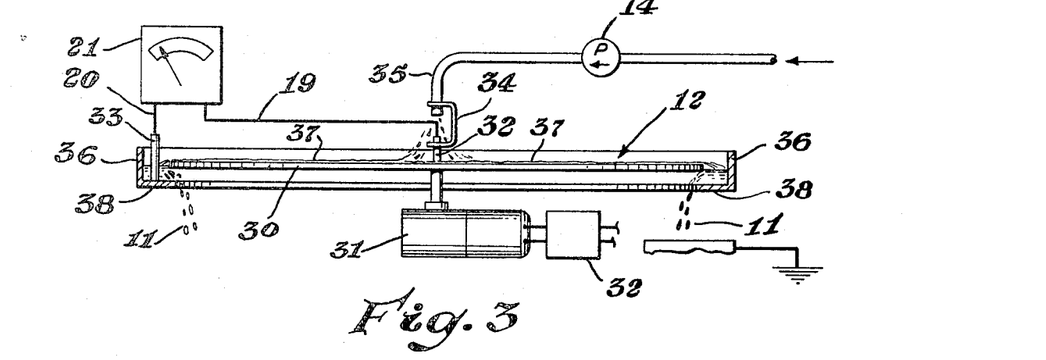
FIGURE 3 schematically illustrates the use of centrifugal force in the control signal generating process of the invention to maintain a flowing aqueous stream across a dielectric surface.

In FIGURE 3 the dielectric surface is constituted by a turntable 30 of a dielectric organic plastic driven by suitable variable speed, induction motor and gear box assembly 31. A rheostat 32 is used to control the speed of the turntable. The aqueous dispersion is fed by means of pump 14 to the top of the turntable 30 through a downspout 35 approximately over the center of rotation. At the peripheral edge of the rotating dielectric turntable 30 is a fixed nonrotating baffle 36 with a lower lip 38. The baffle is slightly removed from but the lip 38 is partly underlying the periphery of the rotating turntable 30. The flowing stream 37 radiates under acceleration from the center of rotation across the surface of the rotating turntable 30 until intercepted by the peripheral baffle 36 which collects the flowing stream 37 on its lower lip 38 and permits it to drain away as a discontinuous stream 11. The upstream electrode 32 is placed in contact with the stream at the downspout 35 in which position it is maintained by the electrically insulating bracket 34. The downstream electrode 33, which is embedded in the lip 38, contacts liquid contained thereon. These electrodes are likewise electrically integrated into an external circuit as shown in FIGURE 1.

In the apparatus of FIGURE 3 the energy difference in the flowing stream between the electrodes is controlled by regulating the revolutions of the turntable 30 surface per unit time. As the rate of revolution is increased, the velocity of the stream 37 and as a result the energy difference possessed by the flowing stream between the electrodes are increased, thereby yielding a higher signal input to the detection device 21. With the apparatus of FIGURES 1 and 2 higher signal values can also be obtained by increasing input energy into the pump.

The electrodes, e.g., 17 and 18, can be any electroconductive substance, which is insoluble in and inert to the aqueous medium constituting the flowing stream. Preferably, the electrodes utilized are reversible electrodes.

One class of reversible electrodes involves electroconductive chemical elements contacting solutions of their own ions. Another type of reversible electrodes is achieved by coating hydrogen, oxygen or a halogen on the surface of an inert noble metal. Still another class of reversible electrodes includes those metal electrodes formed with coatings of insoluble salts of the metal itself, which coated metal is in contact with a solution containing anions of the insoluble metal salt coating. Examples of the latter reversible electrodes are the well-known calomel electrodes. Electrical connection with the flowing stream is accomplished through a salt bridge communicating with the solution. Still another type of reversible electrode is formed from the noble metals including gold and platinum which metals are in contact with solutions containing both an oxidized and reduced form of some chemical compound such as ferric and ferrous chlorides. In general, reversible electrodes consist of an element in two states of oxidation and an electron conductor in contact therewith, which may or may not be the same element.

Typical reversible electrodes which can be utilized efficiently in the present invention include the calomel and silver-silver chloride electrodes.

The dielectric surface contacting the flowing stream between the electrodes must be substantially water insoluble and effectively impermeable to aqueous liquids. It is a characteristic of these materials that whenever in contact with aqueous systems their surfaces develop charged sites through the loss of, or accumulation of, electrons or by ionization.

Variable dielectric materials suitable for employment herein include siliceous materials such as glass, quartz and ceramic compositions having suitable impermeability to liquids, i.e., ability to contain a flowing aqueous stream. Other materials include various organic plastics such as polyethylene, propypropylene, polystyrene, polyperfluoroethylene, polybutadiene rubber and the like vinyl polymerization products. Additional resinous materials suitable for such nonconducting surfaces include various solid polyesters, polyurethanes, phenol-formaldehyde, urea-formaldehyde and the like solid resinous condensation products. Since high strength properties are not required inasmuch as the dieletric surface material can be coated on any desired supporting substrate, any dielectric organic solid not soluble in water such as beeswax, higher molecular weight paraffins and the like can be employed as the materials of construction for the nonconducting dielectric surfaces.

Dispersions of finely divided particles to which the present invention is applicable include aqueous dispersions of finely divided charged particles susceptible of flocculation promoted by dissolved chemical agents which agents are at least in part effective by influencing or altering the charge condition of the disperse particles. Whether the signal generating process is applicable to a particular dispersion is conveniently ascertained by adding, under flocculating conditions, to each of two separate aliquots of the dispersion an anionic flocculant and a cationic flocculant, respectively. While any fluocculant material of the specified classes can be used, effective for the purpose of this test are a high molecular weight sodium polystyrene sulfonate and a polyvinylbenzyl quaternary ammonium chloride, each of the polymers having a molecular weight of at least about 2 million. The dispersion can be effectively evaluated according to the signal generating process of the invention if a floc is formed in either of the treated aliquots. Dispersions susceptible of flocculation are encounted in ore benefaction, industrial wastes such as foundry sand slimes, coal wash water, or predominantly organic wastes from meat packing, canning, paper manufacturing and chemical processing plants. The various highly soluble colloids comprehended by dispersions such as municipal sewage streams are also among the disperse phases intended by the terminology: aqueou dispersions of finely divided charged particles. The invention is particularly well adapted for employment in connection with the flocculation of the latter types of streams.

The following examples are illustrative of various embodiments of the process of the invention inclusive of apparatus for carrying out the same.

Example 1

Figure 4:
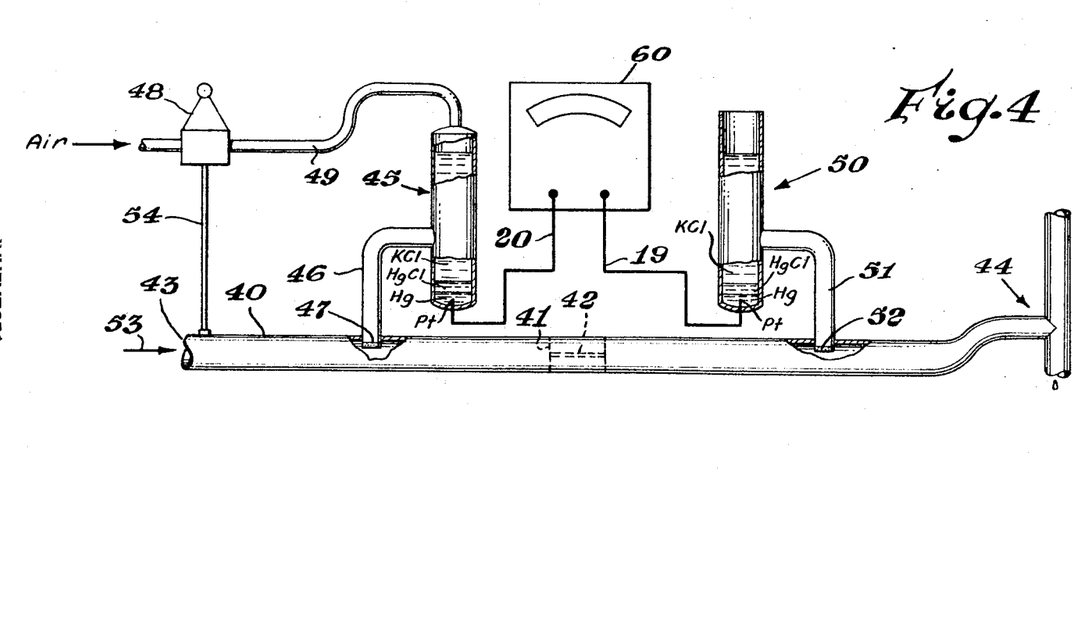
FIGURE 4 is a schematic diagram of apparatus comprising a dielectric capillary with calomel sensing electrodes for carrying out the control signal generating process.

In FIGURE 4 there is shown a preferred embodiment of apparatus for carrying out the process of the present invention. This apparatus consists of a glass conduit 40 with an inlet 43 and an elevated outlet 44. The elevated outlet 44 is raised so as to provide a weir for maintaining the horizontal glass conduit 40 full of liquid. Disposed toward the middle of the glass conduit 40 is a plug 41 containing a capillary 42. On the upstream side of the capillary 42 and electrically communicating with the interior of the glass conduit 40 is a calomel electrode 45 adapted for positive pressurization by means of air pressure controlled by a regulator 48. This regulator senses the upstream pressure through the connecting conduit 54 and automatically counterbalances the pressure in the calomel electrode 45 with that pressure. Such counterbalancing is required in order to prevent dilution of the salt solution within the calomel. Downstream from the plug 41 is a second calomel electrode 50 communicating with the interior of the glass conduit 40. Both of the calomel electrodes 45 and 50 make contact with the liquid in the glass conduit 40 by means of salt bridges 46 and 51 which electrically communicate with the liquid stream through porous ceramic caps 47 and 52. The calomel electrodes are electrically connected to a high impedance electrometer 60.

In operation, the dispersion to be measured is fed into the inlet of the glass conduit 40 under about 6 pounds per square inch pressure. Equal air pressure is applied to the upstream calomel salt cell in the salt bridge to balance the 6 pounds per square inch.

An aqueous base for a series of experimental dispersions was especially prepared from distilled water to which 10 percent by weight tap water was added. In one run 250 parts per million of corn starch was dissolved in the water. The resulting solution was divided into small aliquots which were pretreated with predetermined amounts of polyethylenimine (a cationic flocculant) as specified below. The individual aliquots of treated starch were then fed in sequence to the above-described device having a beeswax capillary plug 41 under 6 pounds per square inch pressure. The voltage sensed at the electrodes was read on the electrometer 60 directly in millivolts.

A second run was conducted in a similar manner but using an aqueous dispersion containing 1,000 parts per million of soluble starch. The voltage readings obtained in these experiments, along with the amounts of polyethylenimine used, are reported in the following table.

TABLE 1

| Dispersion (p.p.m. starch) | Treatment (p.p.m. PEI) | Reading (millivolts) |
|---|---|---|
| 250 | 0 | −10 |
| 250 | 0.1 | −8.5 |
| 250 | 0.4 | −6.5 |
| 250 | 0.8 | −5.0 |
| 250 | 1.6 | +1.5 |
| 1,000 | 0.0 | −10.0 |
| 1,000 | 0.8 | −10.0 |
| 1,000 | 1.6 | −10.0 |
| 1,000 | 3.2 | −9.5 |
| 1,000 | 6.4 | −1.0 |
| 1,000 | 8.0 | +6.0 |

To demonstrate the general applicability of the process regardless of the dielectric capillary material used, plugs 41 were made of nylon, polyethylene and polychlorotrifluoroethylene. Through each was flowed a series of aqueous solutions containing 500 parts per million of starch and a series of polyethylenimine concentrations begining at 0.1 part per million and increasing through 0.8 part per million in 0.1 part increments. The results of these experiments are set forth in the following Table 2.

TABLE 2

| Polyethylenimine p.p.m. | Millivolt Readings | | |
|---|---|---|---|
| | Nylon | Polyethylene | Polychlorotrifluoroethylene |
| 0.1 | >−180 | >−180 | −141 |
| 0.2 | >−180 | >−180 | −128 |
| 0.3 | −142 | −170 | −105 |
| 0.4 | −85 | −112 | −75 |
| 0.5 | −55 | −55 | −50 |
| 0.6 | −25 | −15 | −35 |
| 0.7 | −0 | −0 | −15 |
| 0.8 | +12 | +15 | +10 |

The above data illustrate the general proportionality between the charge amplitude, i.e., concentration of cationic polymer, and the readings obtained. Although different capillary materials will usually give different readings on a system having a given charge condition, the performance of each capillary over a range of charge conditions, i.e., different charge densities on the disperse particles, is reproducible. Thus, any particular capillary can be correlated with the charge neutralizing chemical demand of a system to be flocculated either by empirical experiments or by reference to standard zeta potential measurements on the suspended particles.

The signal derived by this process is extremely valuable in that it can be utilized as a control signal for dosing aqueous streams of dispersed charged particles having variable charge conditions with optimum amounts of charge neutralizing chemicals to induce flocculation of the particles. Since most dispersions of particles are best flocculated at approximately zero zeta potential, and the latter usually substantially corresponds to a zero reading in the above process, it is apparent that by appropriate utilization of circuitry and servomechanisms which sense deviations from a set point, it is possible to control mechanical chemical dosing means with the capability of adjusting chemical flocculant dosages to maintain the disperse phases at a predetermined optimum charge condition for flocculation thereof.

To optimize results in the above process, several considerations pertaining to the consistency of the control signal should be taken into account. It is known, for instance, that both temperature and pH of the aqueous dispersion to be measured affect the rate of charge transport developed between the electrodes. Thus, to provide desirable uniformity, steps should be taken to insure that the pH and temperature of the aqueous dispersion is maintained at a constant level. The temperature range over which the process is operable, however, is limited only by practical considerations such as the temperatures at which the aqueous medium flowed during detection of the signal freezes or boils.

Also the dielectric material which forms the capillary has a bias of its own and, in turn, this may be affected by the chemical nature or pH of the aqueous dispersion being measured. To minimize such effects, it is desirable to use materials of construction for the capillary or other dielectric path which exhibit a low initial bias, i.e., substantially no voltage reading is obtained when distilled and deionized water is the aqueous medium passed through the apparatus.

A fourth parameter which should be controlled within limits, especially when voltage is being measured in the external circuitry, is the conductivity of the aqueous medium used during detection of the developed rate of charge transport. Satisfactory results are achieved when the electroconductance of this stream is equivalent to that or less than that of water containing 500 parts per million of sodium chloride. While readings are obtained at higher conductivities, this value represents a practical limit at about which some of the other variables affecting readings such as pH, temperature, capillary bias and differences between the electrodes, may produce random fluctuations negating the general value of the measurement.

To utilize the above process and apparatus with dispersions of higher conductivity and generally eliminate the effect of conductivity, the process is carried out in a manner similar to that above except that the incident of the rate of charge transport measured is current. This is easily accomplished by substituting for the electrometer a modified form thereof adapted to measure current. The necessary modification involves simply adding a negative feedback circuit to the high gain amplifier circuit of the electrometer to provide an "operational" amplifier.

Example 2

An electrometer such as that described in Example 1 was modified to measure current as well as voltage. This modified meter was incorporated in apparatus like that of Example 1 and used to demonstrate the comparative effect of electroconductance of the aqueous dispersion on voltage and current measurements of the rate of charge transport developed in the dispersion. To carry out this experiment, two polymer dispersions were prepared by dissolving small amounts of each an anionic polymer (sodium polystyrene sulfonate) and a cationic polymer (polyethylenimine) in separate portions of water. To the dilute polymer dispersions thus prepared were added incrementally increasing amounts of sodium chloride. After each addition of the salt the polymer dispersion was passed through the described signal generating apparatus and readings taken successively of each voltage and current incidents of the rate of charge transport developed along the dielectric flow path in the polymer solutions. Although the observed values were not converted into absolute voltage or ampere units, the readings reported below in Table 3 approximate actual millivolt and milliampere measurements.

TABLE 3

| Reading No. | Polymer Dispersion | NaCl Content (p.p.m.) | Voltage Reading | Current Reading |
|---|---|---|---|---|
| 1 | Cationic | 0 | 470 | 60 |
| 2 | do | 1 | 330 | 58 |
| 3 | do | 2 | 275 | 54 |
| 4 | do | 3 | 250 | 45 |
| 5 | do | 5 | 210 | 40 |
| 6 | do | 20 | 40 | 24 |
| 7 | do | 30 | 25 | 19 |
| 8 | do | 50 | 15 | 12 |
| 9 | Anionic | 0 | 600 | 100 |
| 10 | do | 1 | 480 | 100 |
| 11 | do | 2 | 390 | 98 |
| 12 | do | 3 | 330 | 96 |
| 13 | do | 4 | 290 | 94 |
| 14 | do | 5 | 255 | 90 |
| 15 | do | 10 | 165 | 79 |
| 16 | do | 20 | 94 | 60 |
| 17 | do | 30 | 63 | 46 |
| 18 | do | 50 | 48 | 38 |

From the foregoing, it will be observed that the rate of decay of the current measurements with increasing salt content is substantially less than that occurring in the voltage measurements with each addition of sodium chloride. By employing more efficient current measuring devices than the one used for the experiment, it is possible to obtain signals in aqueous media having as much as 5,000 parts per million of the salt.

Example 3

The following is a description of a flocculation process wherein the generated electrical control signal is an intermittent signal. This signal is utilized to provide substantially instantaneous control over the dosing of a chemical flocculant to a flowing aqueous dispersion of finely divided particles, specifically a municipal sewage stream.

Figure 5:
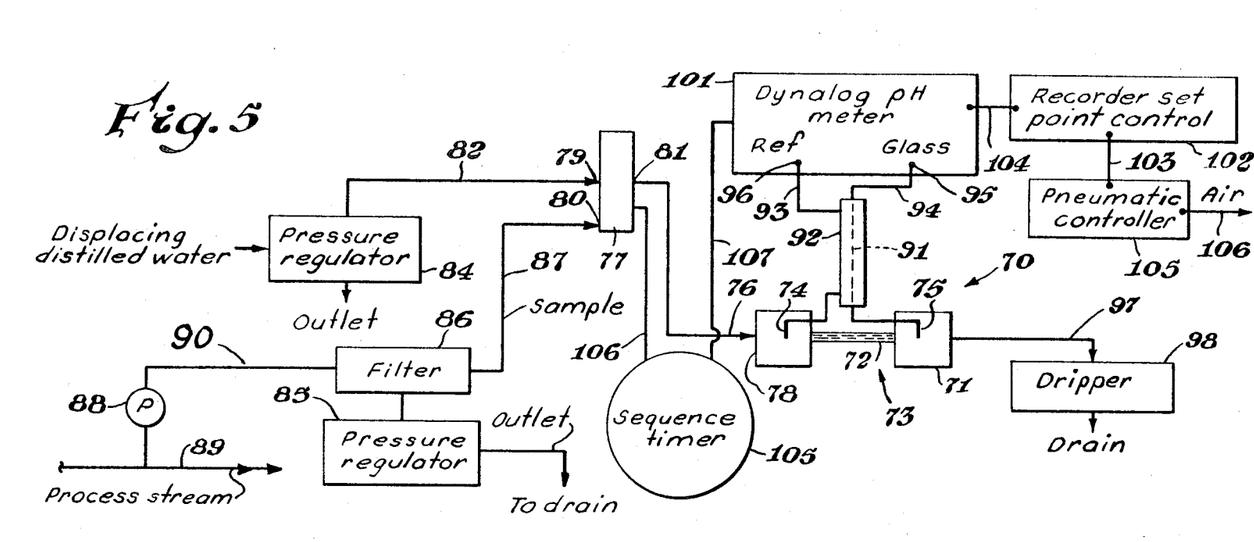
FIGURE 5 is a schematic diagram of one embodiment of apparatus and auxiliary equipment along with process steps necessary for producing an intermittent control signal under the invention.

The control generating apparatus used in this process is illustrated in FIGURE 5. The apparatus 70 comprises a capillary 72 having dielectric walls and identical reversible silver-silver chloride electrodes 74, 75, disposed at the ends of the capillary 72 and in the flow path of any stream channeled through the capillary assembly 73. A connecting tube 76 is coupled to a distributing valve 77 at one end and coupled to the input end 78 of the capillary assembly 73. The distributing valve 77 has two inputs 79, 80 and an output 81 discharging into the connecting tube 76. The input 79 is fed from a source of distilled water under constant pressure, as maintained by the pressure regulator 84, which discharges into distilled water feed line 82. Input 80 is fed a portion of the flocculant treated aqueous dispersion obtained through sampling line 90 from the process stream 89. A pump 88 forces the sample through the sampling line 90 and into a 60 micron filter 86 and thence into the filtered dispersion feed line 87. A back pressure regulator 85 is coupled to the filter to insure constant pressure on the filtered dispersion stream 87 at the distributing valve 77. The output end 71 of the capillary assembly 73 discharges into connecting conduit 97 which is coupled with a dripper device 98. The latter breaks up the output stream from the capillary assembly 73 into discrete droplets. The electrodes 74 and 75 are coupled by co-axial leads 91 and 92 to the terminals of a Dynalog pH meter 101. The amplified signal produced by the meter is fed to a recorder 102 with set point control through electrical lead 104. Any input signal deviations from the set point are reflected by a mechanical pulse applied to a pneumatic controller 105 through mechanical linkage 103. The continuous air output 106 of the latter device is utilized to actuate a remote pneumatically operated valve for regulating the feed of an aqueous solution of a flocculant to the dispersion at a point upstream from the point at which the process stream is sampled.

With regard to the co-axial cable, electrode 74 is connected to the outer shield lead 92 and the electrode 75 is coupled to the inner lead 91. The latter lead is connected to the glass electrode terminal 95 of the Dynalog pH meter 101. Lead 92 is attached to the reference electrode terminal.

During operation, the distributing valve 77 is controlled by the sequence timer 105 through lead 106 so that a filtered sample of the dispersion flows through input 80 alternately with displacing distilled water through input 79, each stream being flowed through the capillary assembly 73 for a period of about 20 seconds each. During the last two seconds of the period during which the distilled water is flowing through the capillary 72, the sequence timer 105 actuates the Dynalog pH meter through electrical lead 107. The meter output is an amplification of the rate of charge transport developed in the stream through the capillary 72 as sensed at the electrodes 74, 75. When this output differs from that preset on the recorder 102, a mechanical pulse is transmitted to the pneumatic controller 105. The modified air output emanating from this controller correspondingly produces a change in a remote polymer dosing mechanism to either increase or decrease the rate of polymer application to the sewage stream.

By operating in the foregoing intermittent mode, the signal amplitude obtained is substantially enhanced and the effects of conductance variations in the aqueous dispersion obtained from the process stream 89 are either obviated or rendered inconsequential in relation to the amplitude of the measurable signal at the electrodes 74, 75.

The foregoing described control signal producing apparatus and process was utilized to dose a raw sewage stream of a Midwestern city with a polyethylene polyamine cationic flocculant. The raw sewage was obtained at the overflow from a primary clarifier. It was pumped at a flow rate of one gallon per minute into an experimental flocculator wherein the raw sewage was given an average of one hour detention time. Subsequently, the flocculated sewage was flowed into a settling tank where it remained for an average of one hour.

The polymer was added continuously as a 0.1 percent aqueous solution to the feed sewage stream just prior to its entry into the flocculator. Sampling of the polymer treated sewage stream corresponding to process stream 89 in FIGURE 5 also occurred just prior to the flocculator. The polymer dose was controlled by feeding the controlled air stream, produced by passing the sample of the treated sewage stream through the above-described apparatus, to a pneumatically operated valve in a pipe line between a supply of the polymer solution and the sewage stream. During operation the dosing of the flocculant varied within the range of 10–15 parts per million by weight of sewage. The set point of the recorder 102 was positioned so as to produce a polymer treatment level corresponding to approximately zero zeta potential.

The supernatant effluent from the settling tank was analyzed by standard techniques for a remaining BOD (biological oxygen demand), SS (suspended solids) and ABS (alkylarylbenzene sulfonate). For the purposes of comparison like analyses were made of the influent settled sewage stream. All analyses were made on representative samples of composites of each stream prepared by intermittent uniform sampling over an 8 hour period.

The results of this operation are set forth in the following Table 4.

TABLE 4

| Day | Pollution Parameter | Settled [1] (p.p.m.) | Treated [2] (p.p.m.) | Filtered [3] (p.p.m.) |
|---|---|---|---|---|
| 1 | BOD | 55 | 8 | 5 |
|   | SS  | 84 | 19 | 0 |
|   | ABS | 3.4 | 1.5 | |
| 2 | BOD | 63 | 17 | 15 |
|   | SS  | 89 | 39 | 0 |
|   | ABS | 3.2 | 1.7 | |
| 3 | BOD | 123 | 16 | 8 |
|   | SS  | 224 | 39 | 0 |
|   | ABS | 6.3 | 1.5 | |
| 4 | BOD | 42 | 15 | 9 |
|   | SS  | 80 | 24 | 0 |
|   | ABS | 3.4 | 1.7 | |

[1] This is the raw influent sewage stream.
[2] This is the supernatant from the flocculated and settled polymer treated sewage stream.
[3] This is the filtrate after passing the above supernatant through a sand filter.

By comparing the polymer demand, as evidenced by the parts per million of the measured pollution parameter, with the relatively uniform results on the treated stream, the flexibility and efficiency of the above process becomes evident. The biological oxygen demand is uniformly reduced to within the range of 8 to 17 p.p.m. from contents in the influent stream of 42 to 123 p.p.m. Similarly, suspended solids are reduced to within the range of 19 to 39 p.p.m. from content extremes in the influent stream of 80 to 224. A similar result is evident for alkylarylbenzene sulfonate removals.

What is claimed is:

1. A method for developing a signal which method comprises
    first flowing an aqueous dispersion of charged particles susceptible of chemically promoted flocculation along a predetermined flow path which is defined, at least for part of the distance along the flow path, by a substantially water-insoluble dielectric conduit, the disperse phase having a variable average surface charge condition,
    thereafter detecting through substantially identical sensing electrodes, spaced apart at points along the flow path in the direction of flow so as to include between them at least a portion of the flow path defined by the dielectric conduit, the rate of charge transport developed in an aqueous medium different than the aqueous dispersion by flowing said aqueous medium along the aforesaid predetermined path between the electrodes, said sensing electrodes being electrically integrated within external electrical circuitry to provide an electrical signal responsive to an incident of the developed rate of charge transport,
    and while detecting the same, discharging the flowing aqueous medium from the flow path in a broken stream.

2. A method for developing an electrical control signal which method comprises
    flowing an aqueous dispersion comprising finely divided, suspended charged particles along a predetermined flow path which is defined, at least for part of the distance along the flow path, by a substantially water-insoluble dielectric conduit, said suspended particles having a variable average surface charge condition,
    detecting through substantially identical sensing electrodes, spaced apart at points along the flow path in the direction of flow so as to include between them at least a portion of the flow path defined by the dielectric conduit, the rate of charge transport developed in an aqueous medium by flowing said aqueous medium along the aforesaid predetermined flow path between the electrodes at a pressure energy difference in the flowing aqueous medium between the electrodes of at least 3 pounds per square inch; said aqueous medium having an electroconductance less than that of water having dissolved therein 500 parts per million of sodium chloride and said aqueous medium being further characterized as being either the aqueous dispersion of finely divided, suspended, charged particles or a second aqueous medium which is flowed alternately with the aqueous dispersion over the predetermined flow path and said sensing electrodes being electrically integrated within external electrical circuitry responsive to minute voltage incidents of the rate of charge transport to provide an electrical control signal, and said flowing aqueous medium included between the electrodes being in an open circuit in relation to electrical ground.

3. A method for developing an electrical control signal which method comprises
    flowing an aqueous dispersion comprising finely divided, suspended charged particles along a predetermined flow path which is defined, at least for part of the distance along the flow path, by a substantially water-insoluble dielectric surface, the line of peripheral contact between the flowing aqueous dispersion and the dielectric surface being at least 0.1 centimeter, said line of peripheral contact being in a plane perpendicular to the direction of flow of the aqueous dispersion and said suspended particles having a variable average surface charge condition,
    detecting through substantially identical sensing electrodes, spaced apart at points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, said aqueous medium being either the aqueous dispersion of finely divided, suspended charged particles or a second aqueous medium flowed alternately with the aqueous dispersion over the predetermined flow path and said sensing electrodes being electrically integrated within external electrical circuitry responsive to minute electrical currents to provide an electrical control signal, and said flowing aqueous medium included between the electrodes being in an open circuit in relation to electrical ground.

4. A method for developing an electrical control signal useful in flocculation processes which method comprises
    flowing an aqueous dispersion comprising finely divided, suspended charged particles along a predetermined flow path which is defined, at least for part of the distance along the flow path, by a substantially water-insoluble dielectric conduit, the line of peripheral contact between the flowing aqueous dispersion and the dielectric conduit being at least 0.1 centimeter, said line of peripheral contact being in a plane perpendicular to the direction of flow of the aqueous dispersion and said suspended particles having a variable average surface charge condition,
    detecting through substantially identical sensing electrodes, spaced apart at points along the flow path in the direction of flow so as to include between them at least a portion of the flow path defined by the dielectric conduit, the rate of charge transport developed in an aqueous medium by flowing said aqueous medium along the aforesaid predetermined flow path between the electrodes, said aqueous medium being either the aqueous dispersion of finely divided, suspended charged particles or a second aqueous medium flowed alternately with the aqueous dispersion over the predetermined flow path and said sensing electrodes being electrically integrated within external electrical circuitry responsive to minute electrical current incidents of the rate of charge transport to provide an electrical control signal, and said flowing aqueous medium included between the electrodes being in an open circuit in relation to electrical ground.

5. A method for developing an electrical control signal useful in flocculation processes which method comprises first flowing an aqueous dispersion comprising finely divided, suspended charged particles along a predetermined flow path which is defined, at least for part of the distance along the flow path, by a substantially water-insoluble dielectric surface, said suspended particles having a variable average surface charge condition, thereafter detecting through substantially identical, reversible sensing electrodes, spaced apart at points along the flow path in the direction of flow so as to include between them at least a portion of the flow path defined by the dielectric surface, the rate of charge transport developed in an aqueous medium different than the aqueous dispersion by flowing said aqueous medium along the aforesaid predetermined flow path between the electrodes, said sensing electrodes being electrically integrated within external electrical circuitry to provide an electrical control signal responsive to an incident of the rate of charge transport, and said flowing aqueous medium included between the electrodes having a low resistivity in relation to any other electrical circuit between a point downstream with a point upstream along the predetermined flow path excluding from consideration the electrode measuring circuit.

6. A method for developing an electrical control signal useful in flocculation processes which method comprises first flowing an aqueous dispersion comprising finely divided, suspended charged particles along a predeterminied flow path which is defined, at least for part of the distance along the flow path, by a substantially water-insoluble dielectric conduit, said suspended particles having a variable average surface charge condition, therafter detecting through substantially identical, reversible sensing electrodes, spaced apart at points along the flow path in the direction of flow so as to include between them at least a portion of the flow path defined by the dielectric conduit, the rate of charge transport developed in an aqueous medium different than the aqueous dispersion by flowing said aqueous medium along the aforesaid predetermined flow path between the electrodes after having previously flowed the dispersion thereover, said sensing electrodes being electrically integrated within external electrical circuitry to provide an electrical control signal responsive to an incident of the rate of charge transport, and said flowing aqueous medium included between the electrodes being in an open circuit in relation to electrical ground.

7. A method for developing an electrical control signal useful in flocculation processes which method comprises first flowing an aqueous dispersion comprising finely divided, suspended charged particles along a predetermined flow path which is defined, at least for part of the distance along the flow path, by a substantially water-insoluble dielectric conduit, said suspended particles having a variable average surface charge condition, and thereafter detecting through substantially identical, reversible sensing electrodes, spaced apart at points along the flow path in the direction of flow so as to include between them at least a portion of the flow path defined by the dielectric conduit, the rate of charge transport developed in an aqueous medium different from the dispersion and having an electroconductance less than that of an aqueous solution containing 100 parts per million of sodium chloride by flowing said aqueous medium along the aforesaid predetermined flow path between the electrodes, said sensing electrodes being electrically integrated within external electrical circuitry to provide an electrical control signal responsive to an incident of the rate of charge transport, and while detecting the same discharging the flowing aqueous medium from the flow path in a broken stream.

8. A method for developing an electrical control signal useful in flocculation processes which method comprises flowing an aqueous dispersion comprising finely divided, suspended charged particles along a predetermined flow path which is defined, at least for part of the distance along the flow path, by a substantially water-insoluble dielectric surface, the line of peripheral contact between the flowing aqueous dispersion and the dielectric surface being at least 0.1 centimeter, said line of peripheral contact being in a plane perpendicular to the direction of flow of the aqueous dispersion and said suspended particles having a variable average surface charge condition, simultaneously detecting through substantially identical electrodes, spaced apart at points along the flow path in the direction of flow so as to include between them at least a portion of the flow path defined by the dielectric surface, the rate of charge transport developed in the flowing dispersion between the electrodes, said aqueous medium being either the aqueous dispersion of finely divided, suspended charged particles or a second aqueous medium flowed alternately with the aqueous dispersion over the predetermined flow path and said sensing electrodes being electrically integrated within external electrical circuitry to provide an electrical control signal responsive to an incident of the rate of charge transport, and said flowing dispersion included between the electrodes being in an open circuit in relation to electrical ground.

9. A method for developing an intermittent electrical control signal useful in flocculation processes which method comprises first flowing an aqueous dispersion comprising finely divided, suspended charged particles along a predetermined flow path which is defined, at least for part of the distance along the flow path, by a substantially water-insoluble dielectric surface, said suspended particles having a variable average surface charge condition, thereafter detecting through substantially identical sensing electrodes, spaced apart at points along the flow path in the direction of flow so as to include between them at least a portion of the flow path defined by the dielectric surface, the rate of charge transport developed in an aqueous medium different than the aqueous dispersion having an electroconductance less than that of an aqueous solution containing 100 parts per million of sodium chloride by flowing said aqueous medium along the aforesaid predetermined flow path between the electrodes, said sensing electrodes being electrically integrated within external electrical circuitry to provide an electrical control signal during the flowing of the aqueous medium responsive to an incident of the rate of charge transport, and said flowing aqueous medium included between the electrodes being in an open circuit in relation to electrical ground.

10. A method for developing an intermittent electrical control signal useful in flocculation processes which method comprises first flowing an aqueous dispersion comprising finely divided, suspended charged particles along a predetermined flow path which is defined, at least for part of the distance along the flow path, by a substantially water-insoluble dielectric conduit, said suspended particles having a variable average surface charge condition, thereafter detecting through substantially identical sensing electrodes, spaced apart at points along the flow path in the direction of flow so as to include between them at least a portion of the flow path defined by the dielectric conduit, the rate of charge transport developed in an aqueous medium different than the aqueous dispersion having an electroconductance less than that of an aqueous solution containing 100 parts per million of sodium chloride by flowing said aqueous medium along the aforesaid predetermined flow path between the electrodes, said sensing electrodes being electrically integrated within external electrical circuitry to provide an electrical control signal during the flowing of the aqueous medium responsive to an incident of the rate of charge transport, and while detecting the same, discharging the flowing aqueous medium from the flow path in a broken stream.

11. A method for developing an electrical control signal useful in flocculating processes for municipal and industrial sewage streams which method comprises flowing a portion of a sewage stream along a predetermined flow path which is defined, at least for part of the distance along the flow path, by a substantially water-insoluble dielectric surface, the line of peripheral contact between the dielectric surface and sewage stream being at least 0.1 centimeter, said line of peripheral contact being in a plane perpendicular to the direction of flow of the sewage stream, detecting through substantially identical sensing electrodes, spaced apart at points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, said aqueous medium being either the sewage or a second aqueous medium flowed alternately with the sewage over the predetermined flow path and said sensing electrodes being electrically integrated within external electrical circuitry to provide an electrical control signal responsive to an incident of the rate of charge transport, and said flowing aqueous medium included between the electrodes being in an open circuit in relation to electrical ground.

12. A method for developing an intermittent electrical control signal useful in flocculation processes for municipal and industrial sewage streams which method comprises first flowing a portion of a sewage stream along a predetermined flow path which is defined, at least for part of the distance along the flow path, by a substantially water-insoluble dielectric surface, thereafter detecting through substantially identical electrodes, spaced apart at points along the flow path in the direction of flow so as to include between them at least a portion of the flow path defined by the dielectric surface, the rate of charge transport developed in an aqueous medium different from the sewage and having an electroconductance less than that of an aqueous solution containing 100 parts per million of sodium chloride by flowing said aqueous medium along the aforesaid predetermined flow path between the electrodes, said sensing electrodes being electrically integrated within external electrical circuitry to provide a control signal during the flowing of the aqueous medium responsive to an incident of the rate of charge transport, and said flowing aqueous medium included between the electrodes being in an open circuit in relation to electrical ground.

13. A method for developing an electrical signal useful in flocculating processes for municipal and industrial sewage streams which method comprises flowing a portion of a sewage stream along a predetermined flow path which is defined, at least for part of the distance along the flow path, by a substantially water-insoluble dielectric surface, the line of peripheral contact between the dielectric surface and flowing sewage stream being at least 0.1 centimeter, said line of peripheral contact being in a plane perpendicular to the direction of flow of the sewage stream, simultaneously detecting through substantially identical electrodes, spaced apart at points along the flow path in the direction of flow so as to include between them at least a portion of the flow path defined by the dielectric surface, the rate of charge transport developed in the flowing sewage between the electrodes, said sensing electrodes being electrically integrated within external electrical circuitry to provide an electrical control signal responsive to an incident of the rate of charge transport, and said flowing sewage stream included between the electrodes being in an open circuit in relation to electrical ground.

14. A method for carrying out the controlled addition of a charge influencing chemical flocculant to an aqueous dispersion comprising charged particles, which method comprises adding a water-soluble, charge influencing flocculant to the aqueous dispersion with mixing, flowing a portion of the flocculant treated aqueous dispersion along a predetermined flow path which is defined, at least for part of the distance along the flow path, by a substantially water-insoluble dielectric surface, detecting through substantially identical sensing electrodes, spaced apart at points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, said aqueous medium being either the flocculant treated aqueous dispersion or a second aqueous medium flowed alternately with the flocculant treated aqueous dispersion over the predetermined flow path, and said aqueous medium being further characterized as having a low resistivity in relation to any other electrical circuit between a point downstream with a point upstream along the predetermined flow path, excluding from consideration the electrode measuring circuit and said sensing electrodes being electrically integrated within external electrical circuitry to provide an electrical control signal responsive to an incident of the rate of charge transport, and feeding the electrical control signal to a set point controller whereby a deviation in the input control signal from a predetermined preset level actuates secondary control means for adjusting the dose rate of the chemical flocculant to maintain the aforesaid derived control signal at the preset level.

15. A method for carrying out the controlled addition of a charge influencing chemical flocculant to an aqueous dispersion comprising finely divided, suspended charged particles, which suspended particles have a variable average surface charge condition, which method comprises adding a water-soluble, charge influencing flocculant to the aqueous dispersion with mixing, flowing a portion of the flocculant treated aqueous dispersion along a predetermined flow path which is defined, at least for part of the distance along the flow path, by a substantially water-insoluble dielectric surface, detecting through substantially identical sensing electrodes, spaced apart at points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, said aqueous medium being either the flocculant treated aqueous dispersion or a second aqueous medium flowed alternately with the flocculant treated aqueous dispersion over the predetermined flow path and said sensing electrodes being electrically integrated within external electrical circuitry to provide an electrical control signal responsive to an incident of the rate of charge transport, and said flowing aqueous medium included between the electrodes being in an open circuit in relation to electrical ground, and feeding the electrical control signal to a set point controller whereby a deviation in the input control signal from a pretermined preset level actuates secondary control means for adjusting the dose rate of the chemical flocculant to maintain the aforesaid derived control signal at the preset level.

16. A method for carrying out the controlled addition of a charge influencing chemical flocculant to an aqueous dispersion comprising finely divided, suspended charged particles, which suspended particles have a variable average surface charge condition, which method comprises adding a water-soluble, charge influencing flocculant to the aqueous dispersion with mixing, flowing a portion of the flocculant treated aqueous dispersion along a predetermined flow path which is defined, at least for part of the distance along the flow path, by a substantially water-insoluble dielectric conduit, detecting through substantially identical sensing electrodes, spaced apart at points along the flow path in the direction of flow so as to include between them at least a portion of the flow path defined by the dielectric conduit, the rate of charge transport developed in an aqueous medium by flowing said aqueous medium along the aforesaid predetermined flow path between the electrodes, said aqueous medium being either the flocculant treated aqueous dispersion or a second aqueous medium flowed alternately with the aqueous dispersion over the predetermined flow path and said sensing electrodes being electrically integrated within external electrical circuitry to provide an electrical control signal responsive to an incident of the rate of charge transport, and while detecting the same, discharging the flowing aqueous medium from the flow path in a broken stream, and feeding the electrical control signal to a set point controller whereby a deviation in the input control signal from a preset predetermined level actuates secondary control means for adjusting the dose rate of the chemical flocculant to maintain the aforesaid derived control signal at the preset level.

17. A method as in claim 16 wherein the pressure energy difference possessed by the flowing aqueous medium between the electrodes is at least 3 pounds per square inch.

18. A method for carrying out the controlled addition of a charge influencing chemical flocculant to municipal and industrial sewage streams, which method comprises adding a water-soluble, charge influencing flocculant to a sewage stream with mixing, flowing a portion of the flocculant treated sewage stream along a predetermined flow path which is defined, at least for part of the distance along the flow path, by a substantially water-insoluble dielectric surface, detecting through substantially identical, sensing electrodes, spaced apart at points along the flow path in the direction of flow so as to include between them at least a portion of the flow path defined by the dielectric surface, the rate of charge transport developed in an aqueous medium by flowing said aqueous medium along the aforesaid predetermined flow path between the electrodes, said aqueous medium being either the flocculant treated sewage or a second aqueous medium flowed alternately with the flocculant treated sewage over the predetermined flow path and said sensing electrodes being electrically integrated within external electrical circuitry to provide an electrical control signal responsive to an incident of the rate of charge transport, and said flowing aqueous medium included between the electrodes being in an open circuit in relation to electrical ground, and feeding the electrical control signal to a set point controller whereby a deviation in the input control signal from a predetermined preset level actuates secondary control means for adjusting the dose rate of the chemical flocculant to maintain the aforesaid derived control signal at the preset level.

19. A method for carrying out the controlled addition of a charge influencing flocculant to municipal and industrial sewage streams, which method comprises adding a water-soluble, charge influencing flocculant to a sewage stream with mixing, flowing a portion of the flocculant treated sewage stream along a predetermined flow path which is defined, at least for part of the distance along the flow path, by a substantially water-insoluble dielectric surface, detecting through substantially identical sensing electrodes, spaced apart at points along the flow path in the direction of flow so as to include between them at least a portion of the flow path defined by the dielectric surface, the rate of charge transport developed in the flowing treated sewage between the electrodes, said sensing electrodes being electrically integrated within external electrical circuitry to provide an electrical control signal responsive to an incident of the rate of charge transport, said flowing treated sewage included between the electrodes being in an open circuit in relation to electrical ground, and feeding the electrical control signal to a set point controller whereby a deviation in the input control signal from a predetermined preset level actuates secondary control means for adjusting the dose rate of the chemical flocculant to maintain the aforesaid derived control signal at the preset level.

20. A method for carrying out the controlled addition of a charge influencing chemical flocculant to municipal and industrial sewage streams, which method comprises adding a water-soluble, charge influencing flocculant to a sewage stream with mixing, flowing a portion of the flocculant treated sewage stream along a predetermined flow path which is defined, at least for part of the distance along the flow path, by a substantially water-insoluble dielectric surface, and thereafter detecting through substantially identical sensing electrodes, spaced apart at points along the flow path in the direction of flow so as to include between them at least a portion of the flow path defined by the dielectric surface, the rate of charge transport developed in an aqueous medium different from the flocculant treated sewage and having an electroconductance less than that of an aqueous solution containing 100 parts per million of sodium chloride by flowing said aqueous medium along the aforesaid predetermined flow path between the electrodes, said sensing electrodes being electrically integrated within external electrical circuitry to provide an electrical control signal responsive to an incident of the rate of charge transport, and said flowing aqueous medium included between the electrodes being in an open circuit in relation to electrical ground, and feeding the electrical control signal to a set point controller whereby a deviation in the input control signal from a predetermined preset level actuates secondary control means for adjusting the dose rate of the chemical flocculant to maintain the aforesaid derived control signal at the preset level.

References Cited
UNITED STATES PATENTS 3,250,117  5/1966  Dajani _______________ 324—71

OTHER REFERENCES

Glasstone and Lewis, Elements of Physical Chemistry, Van Nostrand Co., 2nd edition, pp. 576–583 (P.O.S.L.).

Klinkenberg and Van der Minne, Electrostatics in the Petroleum Industry, 1958, Elsevoir Pub. Co., 1958, pp. 49–50 (P.O.S.L.).

Riddick, T. M., Zeta Potential and Its Application to Difficult Waters, Jour. AWWA, August 1961, vol. 53, pp. 1017–1030.

Betz Handbook of Industrial Water Conditioning, 5th edition, 1957, Betz Laboratories, Inc., Philadelphia, Pa., page 1 relied on. (Group 170.)

MICHAEL E. ROGERS, *Primary Examiner.*